United States Patent

[11] 3,570,618

[72] Inventors: Jury Petrovich Samatov, Prospert Lenina, 22, kv.30; Ellen Robertovna Melman, Nakhimova, 129 kv.14; Vladimir Vasilievich Emelianenko, Turistov, 106, kv.39; Boris Mikhailovich Pozin, Diskovy per., 36, kv.13, Chelyabinsky, U.S.S.R.
[21] Appl. No.: 760,421
[22] Filed: Sept. 18, 1968
[45] Patented: Mar. 16, 1971

[54] RUNNING GEAR FOR ENDLESS TRACK TRACTORS
5 Claims, 4 Drawing Figs.

[52] U.S. Cl.................................................. 180/9.5, 305/29
[51] Int. Cl.................................................. B62d 55/16
[50] Field of Search........................................ 305/29, 30, 31, 32, 27, 28; 180/9.5; 267/57; 280/124.3

[56] References Cited

UNITED STATES PATENTS

| | | | |
|---|---|---|---|
| 1,520,416 | 12/1924 | Holt | 305/27 |
| 1,824,086 | 9/1931 | Knox | 305/27 |
| 2,315,421 | 3/1943 | Heaslet | 305/29x |
| 2,468,957 | 5/1949 | Burks | 305/11 |

FOREIGN PATENTS

| | | | |
|---|---|---|---|
| 1,250,215 | 11/1960 | France | 280/124.3 |
| 1,300,315 | 6/1962 | France | 267/57 |

*Primary Examiner*—Richard J. Johnson
*Attorney*—Waters, Roditi, Schwartz & Nissen ABSTRACT: An endless track tractor has a running gear which comprises a tractor frame with side equalizers hinge-connected to one another and to the frame, the equalizers carrying resilient track support rollers. Also mounted on the equalizers are guiding idler wheels and these idler wheels are resiliently supported through the intermediary of an arm connected to a torsion bar pipe which is mounted in a support slidable along the beams of the side equalizers.

RUNNING GEAR FOR ENDLESS TRACK TRACTORS

The present invention relates to tractor industry, and more specifically to the running gears of endless track tractors employed mainly as traction and transportation means.

Known in the art are running gears endless track tractors wherein side equalizer bars (bogie brackets) with guiding idler wheels and sprung track support rollers are hinged to one another and to the tractor frame.

In conventional running gears of endless track tractors the guiding wheels are rigidly mounted on the side equalizers. Such connection has certain disadvantages: small speeds in movement, low stability, insufficient adhesion and traction qualities.

Known in the prior art are attempts to develop a running gear of endless track tractors wherein the tension wheels were made sprung and track supporting. But this design has a number of disadvantages, some of which may be mentioned here: the tension wheel is cantilever-mounted directly on the tractor frame, which considerably reduces the reliability of the running gear operation; mechanisms and tools mounted in the tractor front cause strong forward trimming thereof due to the rectilinear suspension characteristic of the tension wheels; elevated resistance to tractor rolling is observed in transportation work, as well as in other cases when a track-supporting tension wheel is not required; location of the spring member beyond the endless track space, i.e. within the ground clearance, reduces the latter.

An object of the present invention is to provide a reliable and simple design of the running gear of endless track tractors.

Another object of the invention is to raise the tractor speed in transportation work.

One more object of the present invention is to improve the adhesion and traction qualities of the tractor.

A further object of the invention is to increase the tractor stability when using mounted mechanisms and tools in front thereof, at the same time maintaining the original ground clearance.

A still further object of the invention is the improvement of the driver's working conditions.

In accordance with the above-cited and other objects of the invention, the invention consists in springing the guiding wheels of the side equalizers in the running gear of endless track tractors.

It is preferred that the sprung guiding wheels within the side equalizers be made track-supporting.

It is also preferred to spring the guiding wheels by way of an arm attached to a torsion bar pipe that is mounted in supports sliding along the beams of the side equalizers.

It is desirable that this arm should be one of the arms of a lever whose other arm would interact with a set screw and a resilient member fixed in the sliding support.

It is also desirable to connect the middle part of said lever, by way of a splined joint, with the torsion bar pipe whose ends are mounted is said sliding supports with a possibility for pipe turning, while the ends of the torsion bar strips should be rigidly jointed to said support on one side and to the torsion bar pipe on the other side.

Adjustable stops can be used on the inner sides of the sliding support, to be located opposite the ends of the guiding wheel axle.

Other objects and advantages of the present invention will become apparent from the following description and the appended drawings, wherein.

In the version of the invention considered herein concrete terms are used for the sake of clarity. However, it should be borne in mind that the invention is not restricted to the narrow terms accepted herein, and that each such term comprehends all the equivalent members acting in a similar way and intended to achieve the same objectives.

Figure 1:
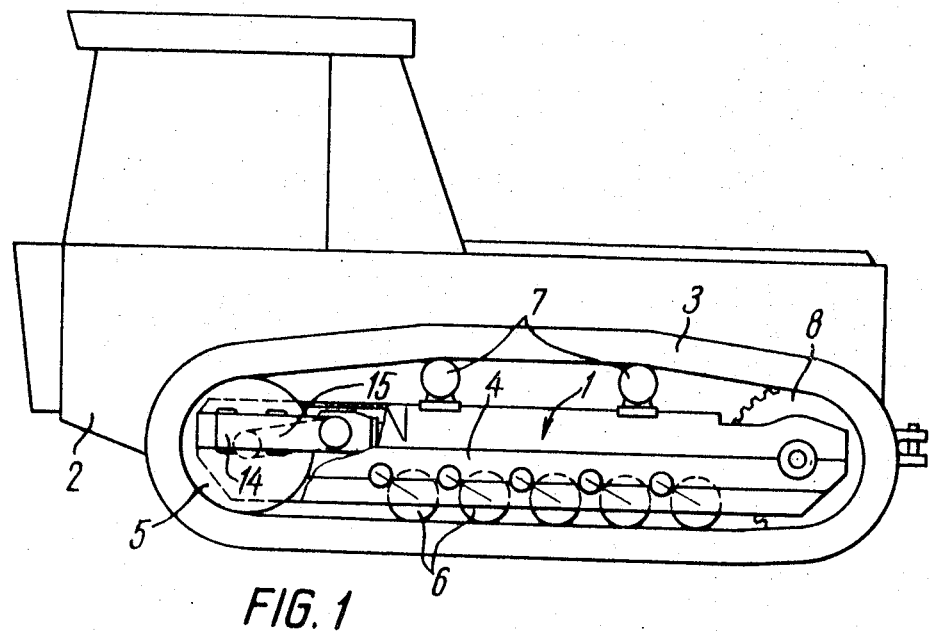
FIG. 1 is a side view of the running gear of an endless track tractor, according to the invention.

The running gear consists of two side equalizers (bogies) 1 (FIG. 1) connected with the tractor frame 2, and endless chains 3. Side equalizers 1 are hinge-connected to one another.

Each side equalizer includes a frame 4, a guiding wheel 5 mounted in said frame, sprung track support rollers 6 mounted in the same frame 4, track carrier rollers 7, and a driving wheel 8.

The guiding wheel 5 of each side equalizer is, according to the invention, made sprung and track-supporting.

Figure 3:
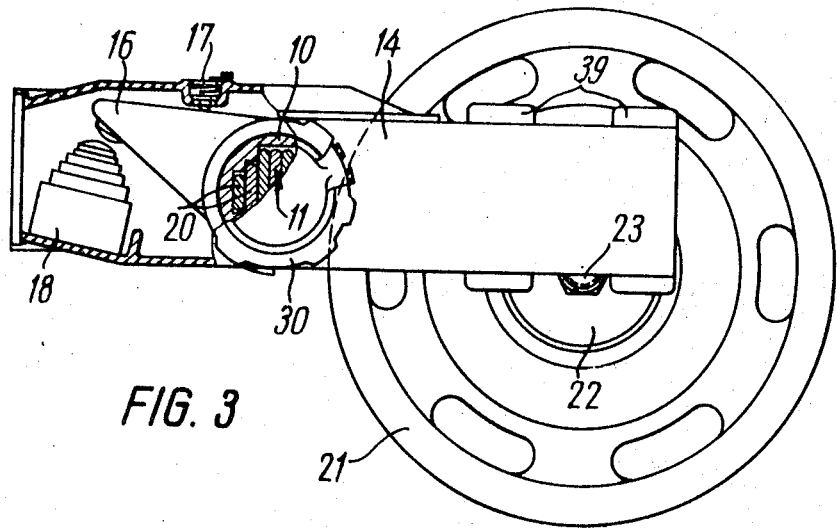
FIG. 3 is a side view with a partial section through the torsion bar showing the lever interaction with the set screw and the resilient member.
Figure 2:
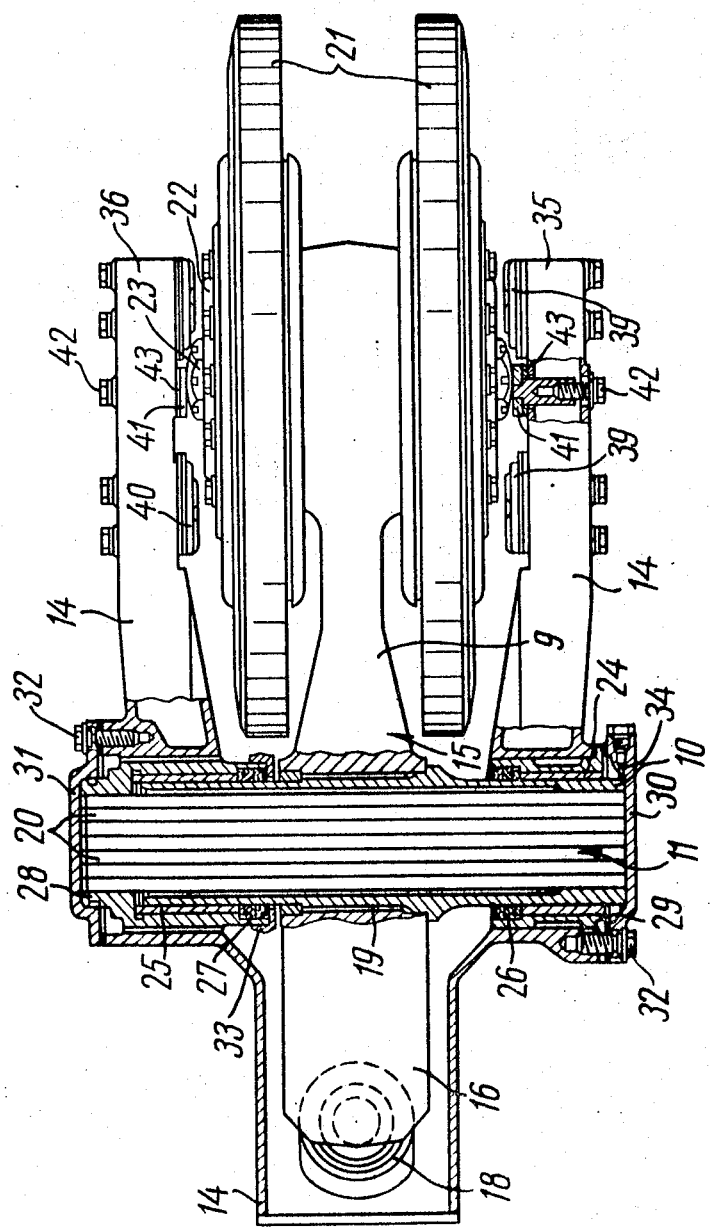
FIG. 2 illustrates the sprung guiding wheel in plan view (with a partial section through the torsion bar)
Figure 4:
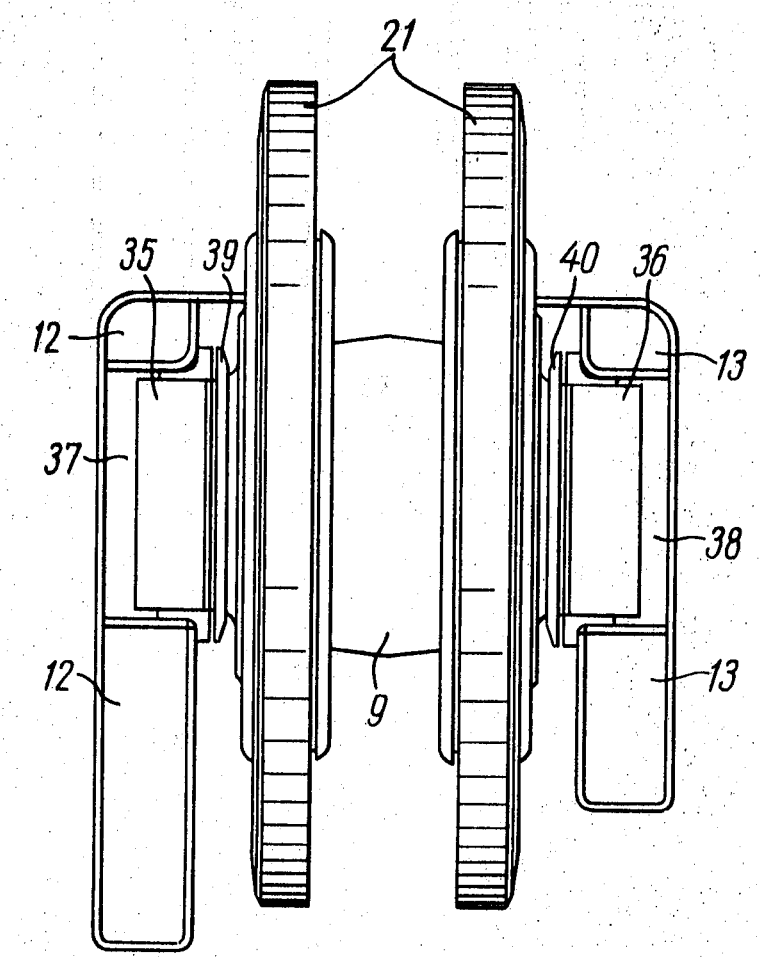
FIG. 4 is a front view thereof.

Springing of the guiding wheel is effected by way of arm 9 (FIG. 2) attached to pipe 10 of torsion bar 11, which pipe is mounted in support 14 (FIG. 2) sliding in beams 12 and 13 (FIG. 4) of frame 4. Arm 9 in this design constitutes one of the arms of lever 15 whose other arm 16 interacts with set screw 17 (FIG. 3) and resilient member 18 mounted on said sliding support 14. The middle part of lever 15 (FIG. 2) is attached, through a splined joint 19, to pipe 10 of torsion bar 11, the ends of said pipe being so mounted in sliding support 14 as to allow pipe turning, while the ends of strips 20 of torsion bar 11 are joined to support 14 on one side and to pipe 10 on the other side.

Guiding wheel 5 is composed of two rims 21, hub 22 and axle 23.

Pipe 10 of torsion bar 11 is mounted in support 14 by way of slide bearings 24 and 25 with packing 26 and 27.

The slide bearings with their packings are placed in sleeves 28 and 29 permanently fixed in support 14.

On the side ends of support 14 caps 30 and 31 are fixed by means of bolts 32.

A thrust collar 33 is pressed on the inner end of sleeve 28 to receive axial loads, while thrust loads of the opposite direction are carried by cap 30 through pipe 10 of torsion bar 11. Torsion bar 11 and bearings 24 and 25 are lubricated through channels 34 made in caps 30 and 31.

Support 14 has the shape of a fork, whose front ends 35 and 36 are mounted in slots 37 and 38 (FIG. 4) made in beams 12 and 13 of frame 4 of bogie 1.

On the inner side of ends 35 and 36 of support 14 adjustable stops 39 and 40 are fixed to resist axial loads from the guiding wheel and transmit them to supports 14 and beams 12 and 13 of frame 4.

Opposite the ends of axle 23 of guiding wheel 5 there are thrust stops 41 (FIG. 2) fixed on support 14 by bolts 42. The clearance between the end of axle 23 and stop 41 is adjusted by gaskets 43. Stops 41 are intended to reduce the effect of bending moments, particularly during tractor turns, on lever 15, and prevent strains of arm 9.

When the running gear is made with a track-supporting guiding wheel 5, i.e. in the traction version of the tractor, springing of the running gear is effected in the following way.

As wheel 5 runs against an obstacle it is raised thereby. In this case arm 9 together with pipe 10 turns in slide bearings 24 and 25, thus twisting torsion bar 11. The second arm 16 of lever 15 interacts with resilient member 18 which provides for a curvilinear suspension characteristic.

After guiding wheel 5 passes the obstacle, torsion bar 11 untwists and brings pipe 10 together with arm 9 into their initial position.

In the other version of the running gear, when guiding wheel 5 does not support the track, i.e. in the transportation version, the running gear as it comes across an obstacle is sprung as in the version with a track-supporting guiding wheel.

The guiding wheel is shifted from a support position into a nonsupport position by lowering set screw 17, thus lowering arm 16 of lever 15.

Lever 15 together with pipe 10 turns in slide bearings 24 and 25, twisting torsion bar 11 and raising guiding wheel 5.

The advantages of the described running gear of endless track tractors consist in that the track-supporting guiding wheel, according to the invention, provides high adhesion and traction qualities of h the tractor together with increased speed thereof, and increased tractor stability and operational reliability of its running gear.

Moreover, such a design of the guiding wheel permits rapid shifting of said wheel from the support into the nonsupport position when employing the tractor in transportation work, which ensures high transportation speeds and reduced power losses to overcome rolling resistance.

Although the present invention is described with reference to the preferred embodiment thereof, alterations and modifications can be made without departing from concept and scope of the invention, as will be easily understood by those skilled in the art. These alterations and modifications are to be considered as falling within the concept and scope of the invention as defined in the appended claims.

We claim:

1. A running gear of a tractor with a endless track, said running gear comprising: a tractor frame; side equalizers hinge-connected to one another and to said tractor frame; track support rollers resiliently mounted on said equalizers; guiding idler wheels for the endless track; and means resiliently mounting the idler wheels on said side equalizers, the latter means comprising a slidable support on each equalizer, an arm connected to each idler wheel, and a torsion bar pipe connected to said arm and mounted in an associated slidable support.

2. A running gear as claimed in claim 1 wherein said guiding wheels are positioned to carry the weight of the tractor and support said track while guiding the same.

3. A running gear as claimed in claim 1 wherein each said sliding support has opposite sides, and the associated idler wheel has an axle with ends facing the sides of the sliding support, and adjustable thrust stops on said sides of the sliding support located opposite the ends of the guiding wheel axle.

4. A running gear as claimed in claim 1 wherein said arm constitutes one of the two arms of a lever, and comprising a set screw and a resilient member mounted on the sliding support for engaging the other of the arms of the lever.

5. A running gear as claimed in claim 4 comprising a splined joint connecting the middle part of said lever to the torsion bar pipe, said torsion bar pipe being mounted in the associated sliding support to allow pipe turning, and including torsion bar strips in said pipe having ends joined to said support on one side and to said pipe on the other side.